Figure 1:
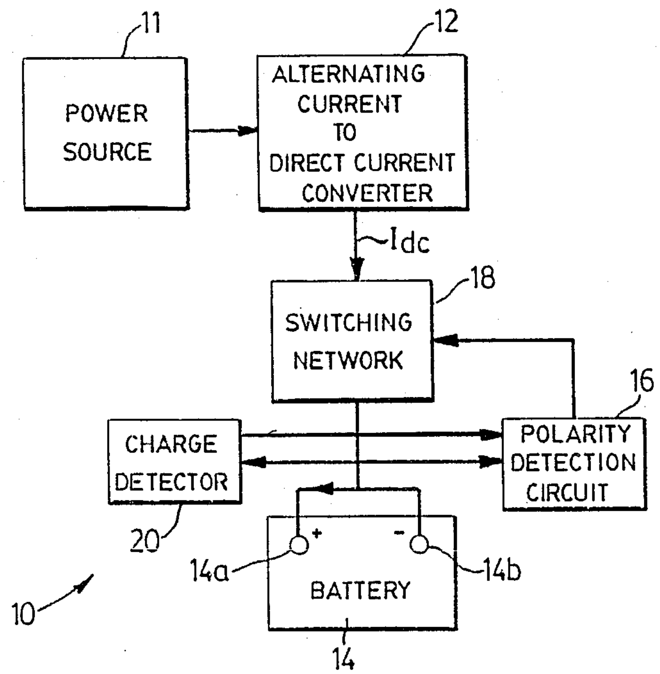

United States Patent [19]

Duncan

[11] Patent Number: 4,876,496

[45] Date of Patent: Oct. 24, 1989

[54] CURRENT SUPPLYING DEVICE

[75] Inventor: Richard C. Duncan, Scarborough, Canada

[73] Assignee: Allanson, Division of Jannock Limited, Toronto, Canada

[21] Appl. No.: 158,932

[22] Filed: Feb. 22, 1988

[51] Int. Cl.[4] .................................................. H02J 7/04

[52] U.S. Cl. .......................................... 320/31; 320/25; 320/39

[58] Field of Search ........................ 320/31, 32, 25, 26, 320/2, 59; 307/127

[56] References Cited

U.S. PATENT DOCUMENTS

| | | | |
|---|---|---|---|
| 3,217,225 | 11/1965 | Gottlieb et al. | 320/37 |
| 3,857,082 | 12/1974 | Van Opijnen | 320/25 |
| 4,309,622 | 1/1982 | Cottrell | 320/59 X |
| 4,400,658 | 8/1983 | Yates | 307/127 X |
| 4,663,579 | 5/1987 | Yang | 320/26 |

*Primary Examiner*—R. J. Hickey

*Attorney, Agent, or Firm*—Thomas A. O'Rourke

[57] ABSTRACT

A current supplying device is provided and connectable across the positive and negative terminals of a battery to supply a direct current to the positive terminal. The device includes an alternating current (AC) to direct current (DC) converter for generating a direct current from an AC power source. A pair of circuits biased to inoperative conditions are coupled to the converter and separately actuable to an operative condition to supply the direct current to one of the battery terminals. A polarity detector senses the polarity of the battery terminals and provides siganls to a plurality of switches which actuate one of the circuits to the operative condition so that the direct current is always supplied to the positive terminal of the battery. Current overload protection is also provided for protecting the polarity detector and inhibiting the operation of the switches in order to return the one circuit to the inoperative condition in the event of unsafe current flow in the one circuit.

9 Claims, 2 Drawing Sheets

CURRENT SUPPLYING DEVICE

The present invention relates to a current supplying device and in particular to a direct current battery charger.

Battery chargers are well known devices and used to supply direct current to the positive terminal of an energy depleted battery. Typically, the battery chargers include an alternating current (AC) to direct current (DC) converter for generating a direct current from an AC household power supply. The chargers also include red and black connection cables for coupling the charger to the depleted battery. When connecting the charger to the battery, the red cable must be connected to the positive terminal and the black cable must be connected to the negative terminal or to a ground so that the direct current is supplied to the positive terminal of the battery.

However, if the red and black cables are reversed and coupled to the improper battery terminals, the battery charger will supply the direct current to the negative terminal of the battery. This situation can result in overheating of the battery charger, excess arcing between the connection cables and the terminals of the battery and in extreme cases battery explosions.

Moreover, in typical battery chargers, if the battery charger is energizing a depleted battery actively engaged in an operating circuit and the circuit attempts to draw a large current from the battery, the potential voltage across the terminals of the battery will drop substantially. When this occurs, the circuit will begin to draw the current from the AC power supply via the AC to DC converter. This situation results in very large currents drawn into the battery charger, thereby increasing the risk of damage to the battery charger. Although a fuse is typically provided in the battery charger to disconnect the circuit from the battery in the event of a large current, when the fuse is tripped, an operator is required to replace the fuse, a process which is time consuming and frustrating. As can be appreciated, there is a need for an improved battery charger.

It is an object of the present invention to obviate or mitigate the above disadvantages.

According to the present invention there is provided a current supplying device connectable across the positive and negative terminals of a battery for supplying a direct current to said positive terminal, said device comprising:

means for connecting said device to a power supply for supplying said direct current;

a pair of circuits each biased to an inoperative condition, each of said circuits being actuable to an operative condition to supply said direct current to one of said terminals;

polarity detection means in communication with said circuits, said polarity direction means for sensing the polarity of said terminals and generating switching signals upon determination of the plurality of said terminals;

switch means responsive to said switching signals to actuate one of said circuits to said operative condition to supply said direct current to said positive terminal;

overload protection means for limiting the direct current applied to said polarity detection means and inhibiting the operation thereof in the event of a current overload.

Preferably, the current supplying device also includes a charge detection means for monitoring the charge of the battery so that when the battery is fully charged, the charge detection means inhibits the polarity detection means and in turn the switch means in order to return the one circuit to the inoperative condition to prevent overcharging of the battery.

It is also preferred that the polarity detection means includes a pair of opto-coupler/isolators, the opto-coupler/isolators being oppositely connected across the terminals of the battery to ensure that only one coupler is forward biased.

Preferably, the switch means comprises two pairs of silicon controlled rectifiers, each pair being associated with one of the circuits and one of the opto-coupler-/isolators so that the pair associated with the forward biased opto-coupler/isolator is gated to provide an operative path for the direct current to the positive terminal.

It is also desired that the overload protection means includes a resistive network, a pair of zener diodes and a pair of diodes, one diode and one zener diode being connected in series with one of the opto-coupler/isolators so that the resistive network, zener diode and diode effect proper voltage regulation and depart from an avalanche state when the potential voltage across the battery terminals drops substantially in order to limit overload currents and inhibit operation of the switch means.

The present device provides the advantage of ensuring that the direct current is supplied to the positive terminal of the battery, thereby preventing battery explosions regardless of how the battery is connected to the device. Furthermore, the provision of the overload protection means prevents damage to the device if it is connected to a battery when the battery is engaged in an operating circuit.

An embodiment of the present invention will now be described by way of example only with reference to the accompany drawings in which:

FIG. 1 is a block diagram of a current supplying device; and

Figure 2:
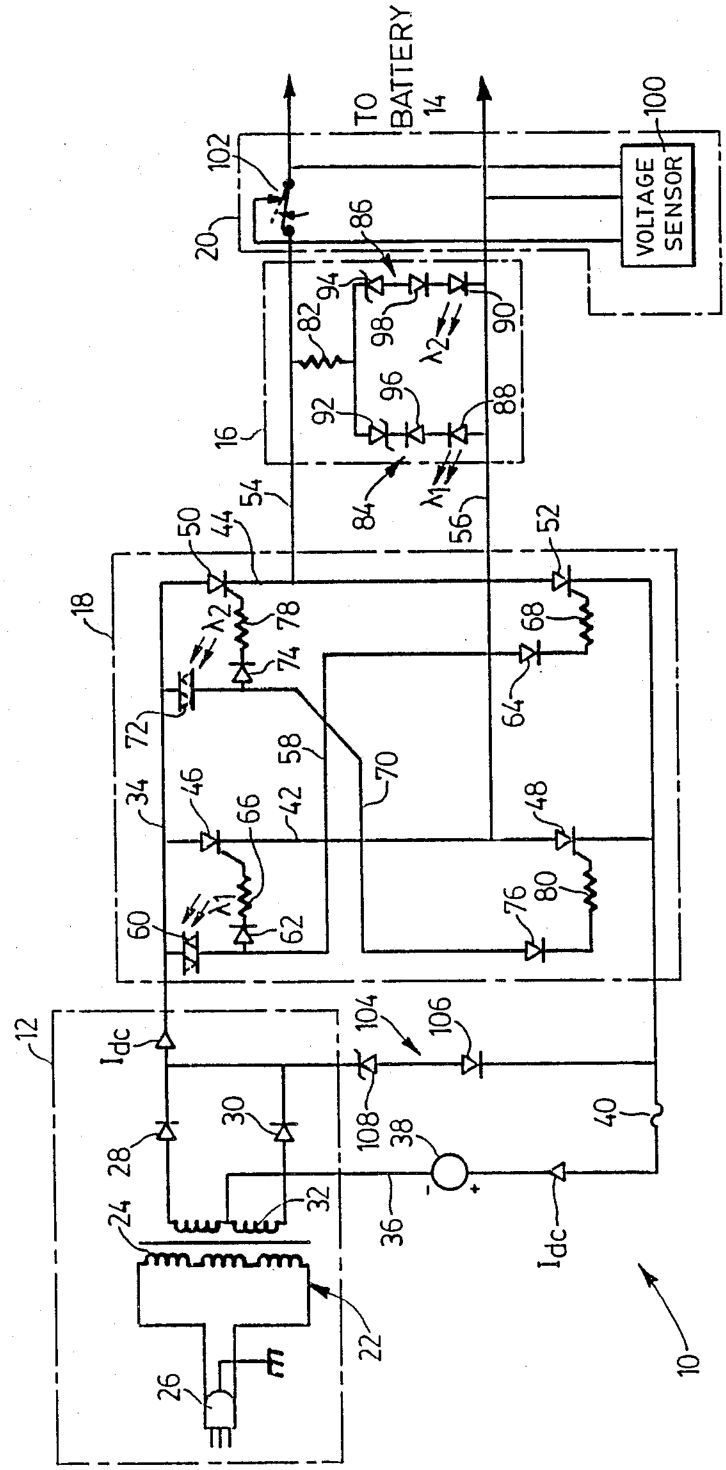

FIG. 2 a schematic circuit diagram of the device illustrated in FIG. 1.

Referring now to FIG. 1, a current supplying device 10 is shown. The device 10 includes an alternating current to direct current converter 12 coupled to an alternating current (AC) power supply 11 for supplying a direct current $I_{dc}$ to the positive terminal 14*a* of an energy depleted battery 14. A polarity detection circuit 16 and a switching network 18 are provided for monitoring the polarity of the terminals 14*a* and 14*b* and redirecting the direct current $I_{dc}$ to ensure that the direct current is always conveyed to the positive terminal. A battery charge detector 20 is also provided for detecting the charge of the battery 14 and inhibiting the direct current flow to the battery 14 when the battery is fully charged.

Referring now to FIG. 2, the current supplying device 10 is better illustrated. The alternating current to direct current converter 12 is of a typical configuration and includes a centre tap transformer 22 having its primary coil 24 removably connectable to the AC power supply 11 by way of a plug 26. A pair of diodes 28 and 30 are connected at one end to either end of the transformer's secondary coil 32 and at the other end to a common conductor 34, to provide full wave rectification of the alternating current supplied to the primary coil 24. A second conductor 36 provides a return path for the direct current $I_{dc}$ to the transformer 22. An ammeter 38 and a current limiting fuse 40 are connected in series with conductor 36 for monitoring the direct current flow through the device 10.

A pair of conductors 42 and 44 form a portion of the switching network 18 and provide a pair of parallel paths for the direct current from conductor 34 to conductor 36. Each of the conductors 42 and 44 includes two silicon controlled rectifiers (SCRs) 46, 48 and 50, 52 respectively connected in series. The SCRs are actuable in a manner to provide a pair of operable circuits which control the direction of flow of the direct current $I_{dc}$ to the battery terminals 14*a* and 14*b*. Connector cables 54 and 56 are coupled at one end to one of the conductors 44 and 42 between the two SCRs and are releasably connectable to the terminals of the battery 14 via suitable connectors (not shown).

The switching network 18 also includes a first gating circuit 58 interconnecting the gate of the SCR 46 to the gate of the SCR 52. The gating circuit 58 is also connected to the conductor 34 via a triac 60 which is optically coupled to the polarity detection circuit 16. The gating circuit 58 also includes diode components 62, 64 and resistive components 66, 68 respectively connected in series to the gate of each SCR 46 and 52. Similarly, the gate of the SCR 50 is coupled to the gate of the SCR 48 via a second gating circuit 70. The second gating circuit 70 is also coupled to the conductor 34 via a triac 72 which is optically coupled to the polarity detection circuit 16. Similarly, the gating circuit 70 is provided with diode components 74, 76, and resistive components 78, 80 respectively connected in series to the gates of the SCRs 50 and 48.

The polarity detection circuit 16 is coupled across the connector cables 54 and 56 and includes a series resistor 82 connected at one end to a pair of parallel circuits 84 and 86. The parallel circuits 84 and 86 each include opto-couplers/isolators 88 and 90, zener diodes 92 and 94 and diodes 96 and 98 respectively. The opto-couplers/isolators, zener diodes and diodes are configured oppositely in each circuit 84 and 86 so that only one circuit is activated when the battery 14 is connected to the connector cables 54 and 56. Each opto-coupler-/isolator 88 and 90 is also optically coupled to one of the triacs 60 and 72 respectively.

The battery charge detector 20 is of a typical configuration and includes a voltage sensor 100 coupled across the connector cables 54 and 56 for measuring the potential voltage across the battery terminals 14*a* and 14*b*. A switch 102 responsive to the voltage sensor 100 is also included and disconnects the polarity detection means 16 from the battery 14 when the battery is fully charged. The battery charge detector 20 is well known in the automatic battery charger art and thus, it is believed that a detailed description thereof is not required herein.

A current discharge circuit 104 comprising a diode 106 and a zener diode 108 is coupled to the output end of the rectifying diodes 28 and 30 and extends to conductor 36 to provide a current drain between conductors 34 and 36 if the device 10 is in operation when the battery 14 is removed from the connector cables 54 and 56.

The operation of the device 10 will now be described. With the plug 26 engaged with the AC power supply 11, the transformer 22 and the diodes 28, 30 provide a voltage reduction and a full wave rectification of the AC supply voltage to form a direct current $I_{dc}$ that is supplied to conductor 34. If a battery 14 is not connected across the cables 54 and 56, the zener diode 108 and the diode 106 provide a drainage path between the conductors 34 and 36 to allow the direct current $I_{dc}$ to flow back to the transformer 22 by way of the fuse 40 and the ammeter 38.

However, when a battery 14 is coupled across the cables 54 and 56, the potential voltage of the battery is sensed by the voltage sensor 100 and the polarity of the battery terminals 14*a* and 14*b* is detected by circuit 16.

If the voltage sensor 100 determines that the battery 14 is fully charged the switch 102 is opened thereby preventing current flow to the battery. If, however, the battery 14 is detected as being energy depleted, the switch 102 remains closed allowing the polarity detection circuit 16 to operate.

If the positive terminal 14*a* of the battery 14 is connected to connector cable 54, the potential voltage of the battery 14 causes the zener diode 94 to operate in its avalanche state and allows current to flow in the circuit, thereby causing the optocoupler/isolator 90 to emit photons which are received by the associated optically coupled triac 72. The other parallel circuit 84 does not operate, since the potential voltage of the battery 14 forward biases the zener diode, but reverse biases the diode 96 and the opto-coupler/isolator 88. Thus, the triac 60 remains closed to inhibit the operation of SCRs 46 and 52.

When the triac 72 receives the photons, it provides a short circuit between the conductor 34 and the gating circuit 70. The direct current $I_{dc}$ provided on the conductor 34 flows through the gating circuit 70 and triggers the gates of SCRs 50 and 48 by way of the diodes and resistors 74, 76 and 78, 80 respectively. After the SCRs 50 and 48 have been triggered, they provide short circuits to enable the flow of current therethrough.

Once the SCRs 50 and 48 have been triggered, the direct current $I_{dc}$ passes from conductor 34 along conductor 44 to connection cable 54. The direct current is then conveyed from cable 54 into the positive terminal 14*a*, thereby charging the battery 14.

The return current flows from the negative terminal 14*b* through cable 56 to conductor 42. The current then passes through triggered SCR 48 to conductor 36 and returns to transformer 22 by way of the fuse 40 and the ammeter 38.

If the battery 14 is connected in the opposite manner so that the positive terminal is connected to cable 56, the zener diode 94 becomes forwardly biased and the opto-coupler/isolator 90 and diode 98 become reversed biased thereby inhibiting the operation of the circuit 86 and hence, the triac 72 and the SCRs 48 and 50. However, the other opto-coupler/isolator 88, zener diode 92 and diode 96 become properly biased so that photons are emitted and conveyed to the optically coupled triac 60. The triac 60 in turn short circuits, thereby energizing gating circuit 58 and triggering SCRs 46 and 52 in the same manner previously described.

This in turn allows the current to flow from conductor 34 along conductor 42 by way of SCR 46 and into the positive terminal 14*a* of the battery via cable 56. The return current is conveyed from the negative terminal 14*b* along cable 54 to conductor 44. From conductor 44, the current flows through the SCR 52 to conductor 36 wherein it is returned to the transformer 22. Thus, as can be appreciated, the device 10 ensures that the direct current $I_{dc}$ is always supplied to the positive terminal 14*a* of the battery 14 regardless of which cable 54, 56 is connected to the positive terminal of the battery. It should be realized that, during the charging operation, if the voltage sensor 100 detects that the battery 14 has been fully charged, the switch 102 will be opened. When the polarity detection circuit 16 is isolated from the battery either by the removal of the battery 14 or the opening of switch 102, the activated parallel circuit 84 or 86 will no longer detect a potential voltage and hence, will cease emitting photons. This will de-activate the triggered triac 60 or 72 thereby isolating the active gating circuit 58 or 70 from conductor 34 and in turn de-activate the two operating SCRs, to isolate the direct current from the battery 14.

The resistor 82 and the zener diode in the activated parallel circuit 84 or 86 also provide current protection for the operating opto-coupler/isolator, if the potential voltage of the battery 14 drops when the battery 14 is being used to supply a large current to an operative circuit. Thus, for example, if the device 10 is used to charge a battery 14 coupled to a motor vehicle and the vehicle attempts to draw a large current from the battery 14, the potential voltage across the battery will drop. However, as the potential voltage drops, large currents are drawn into the device 10 from the AC household supply. When this occurs the resistor 82 and zener diode limit the current initially passing into the opto-coupler/isolator and prevent the opto-coupler-/isolator from detecting the polarity of the battery terminals, since the zener diode leaves its avalanche state. This allows the device 10 to operate safely while being connected to a battery engaged in an operating circuit.

The present device allows a battery 14 to be charged regardless of the connection between the cables and the battery terminals. Furthermore, since the opto-couplers/isolators will not emit photons until each cable 54 and 56 is connected across the terminals of the battery 14, the device 10 reduces the occurrence of arcing due to the fact that the cables are electrically dead until the proper opto-coupler/isolator has been activated.

Although the device has been described using an AC household supply as a power source, it should be noted that a DC supply can be used and connected across the conductors 34 and 36, thereby removing the need for the AC to DC converter 12.

However, if the AC to DC converter 12 is being implemented it need not be formed using a centre tap transformer and a pair of diodes. Alternatively, a standard transformer and a bridge rectifier can be used to rectify the AC supply and generate the desired direct current.

The switches although described as being SCRs can be substituted using any integrated switches capable of withstanding typical currents associated in the battery charging environment such as electrically gated triacs. Also, analog switches can be used to perform the same switching function.

It should be apparent to one skilled in the art that various switching and detection methods can be used in the present device to provide proper directional current flow while providing overload current protection when the device is coupled to a battery in an operating circuit.

We claim:

1. A current supplying device connectable across the positive and negative terminals of a battery for supplying a direct current to said positive terminal, said device comprising:

means for connecting said device to a power supply for supplying said direct current;

a pair of circuits each biased to an inoperative condition, each of said circuits being actuable to an operative position to supply said direct current to one of said terminals;

polarity detection means in communication with said circuits, said polarity detection means for sensing the polarity of said terminals and generating switching signals upon determination of the polarity of said terminals;

switch means responsive to said switching signals to actuate one of said circuits to said operative condition to supply said direct current to said positive terminal;

overload protection means for limiting the direct current applied to said polarity detection means and inhibiting the operation thereof in the event of a current overload; and charge detection means for monitoring the charge of said battery and electrically isolating said polarity detection means from said terminals when said battery is fully charged to prevent overcharging of said battery.

2. A current supplying device as defined in claim 1 further comprising a current drain coupled across said circuits for dissipating residual current in said one circuit upon removal of said battery from said device.

3. A current supplying device connectable across the positive and negative terminals of a battery for supplying a direct current to said positive terminal, said device comprising:

means for connecting said device to a power supply for supplying said direct current;

a pair of circuits each biased to an inoperative condition, each of said circuits being actuable to an operative condition to supply said direct current to one of said terminals;

polarity detection means including a pair of opto-couplers in communication with said circuits, said opto-couplers being oppositely connectable across the terminals of said battery to sense the polarity of said terminals, one of said opto-couplers being forward biased when connected across said terminals and generating switching signals;

switch means responsive to said switching signals to actuate one of said circuits to said operative condition to supply said direct current to said positive terminal; and overload protection means for limiting the direct current applied to said polarity detection means and inhibiting the operation thereof in the event of a current overload, said overload protection means including a resistive circuit and a pair of zener diodes, each zener diode being oppositely connected in series with one of said opto-couplers and positioned to operate in an avalanche state when said one opto-coupler is forward biased, said resistive network and said zener diode being responsive to a direct current overload on said one circuit resulting from a potential voltage drop across said battery terminals to isolate said one opto-coupler and inhibit the operation thereof.

4. A currently supplying device as defined in claim 3 wherein said switch means includes first and second sets of silicon controlled rectifiers, each set being associated with one of said opto-couplers and engaged with said circuits, said set associated with said forward biased opto-coupler receiving said switching signals and actuating said one circuit to said operative condition.

5. A current supplying device as defined in claim 1 wherein said means for connecting said device includes a transformer connectable to an alternating current power source and a full wave rectifier for converting said alternating current into said direct current.

6. A current supplying device as defined in claim 3 further comprising charge detection means for monitoring the charge of said battery and electrically isolating said polarity detection means from said terminals when said battery is fully charged to prevent overcharging of said battery.

7. A current supplying device as defined in claim 3 further comprising a current drain coupled across said circuits for dissipating residual current in said one circuit upon removal of said battery from said device.

8. A current supplying device connectable across the positive and negative terminals of a battery for supplying a direct current to said positive terminal, said device comprising:

means for connecting said device to a power supply for supplying said direct current;

a pair of circuits each biased to an inoperative condition, each of said circuits being actuable to an operative condition to supply direct current to one of said terminals;

polarity detection means in communication with said circuits, said polarity detection means for sensing the polarity of said terminals and generating switching signals upon determination of the polarity of said terminals;

switch means responsive to said switching signals to actuate one of said circuits to said operative condition to supply said direct current to said positive terminal;

overload protection means for limiting the direct current applied to said polarity detection means and inhibiting the operation thereof in the event of a current overload; and a current drain coupled across said circuits for dissipating residual current in said one circuit upon removal of said battery from said device.

9. A current supplying device as defined in claim 8 further comprising charge detection means for monitoring the charge of said battery and electrically isolating said polarity detection means from said terminals when said battery is fully charged to prevent overcharging of said battery.

* * * * *